| (12) | United States Patent | (10) Patent No.: | US 9,360,676 B2 |
|---|---|---|---|
| | Corrigan et al. | (45) Date of Patent: | Jun. 7, 2016 |

(54) LIGHT DUCT TEE SPLITTER

(75) Inventors: Thomas R. J. Corrigan, Saint Paul, MN (US); David G. Freier, Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 145 days.

(21) Appl. No.: 14/009,556

(22) PCT Filed: Apr. 2, 2012

(86) PCT No.: PCT/US2012/031800
§ 371 (c)(1),
(2), (4) Date: Oct. 3, 2013

(87) PCT Pub. No.: WO2012/138595
PCT Pub. Date: Oct. 11, 2012

(65) Prior Publication Data
US 2014/0016205 A1   Jan. 16, 2014

Related U.S. Application Data

(60) Provisional application No. 61/473,225, filed on Apr. 8, 2011.

(51) Int. Cl.
| G02B 27/14 | (2006.01) |
| F21V 8/00 | (2006.01) |
| G02B 6/28 | (2006.01) |
| F21S 11/00 | (2006.01) |
| F21V 7/16 | (2006.01) |
| F21V 7/22 | (2006.01) |

(52) U.S. Cl.
CPC ............. *G02B 27/14* (2013.01); *G02B 6/0018* (2013.01); *G02B 6/0096* (2013.01); *G02B 6/2817* (2013.01); *F21S 11/007* (2013.01); *F21V 7/16* (2013.01); *F21V 7/22* (2013.01)

(58) Field of Classification Search
CPC .... G02B 27/09; G02B 27/10; G02B 27/0905; G02B 27/1006; G02B 27/14; G02B 6/2817; G02B 6/0096; G02B 6/0018
USPC .................. 359/618, 619, 627, 629, 633, 639
See application file for complete search history.

(56) References Cited

U.S. PATENT DOCUMENTS

| 247,229 A | 9/1881 | Wheeler |
| 1,837,091 A | 12/1931 | Adams |

(Continued)

FOREIGN PATENT DOCUMENTS

| CH | 690788 | 1/2001 |
| DE | 199 36 187 | 2/2001 |

(Continued)

OTHER PUBLICATIONS

International Search Report for PCT International Application No. PCT/US2012/031800 Mailed on Oct. 18, 2012, 3 pages.

*Primary Examiner* — Darryl J Collins
*Assistant Examiner* — Journey Sumlar
(74) *Attorney, Agent, or Firm* — Yan T. Florczak

(57) ABSTRACT

The disclosure generally relates to highly efficient light duct light splitters that are capable of splitting the light propagating within a light duct into two different ducts, with nearly 100 percent efficiency. In particular, the described light splitters are configured in a "Tee" shape with a reflective splitter element.

18 Claims, 4 Drawing Sheets

(56) References Cited

U.S. PATENT DOCUMENTS

| | | | |
|---|---|---|---|
| 4,152,752 A | | 5/1979 | Niemi |
| 4,302,069 A | * | 11/1981 | Niemi ................. F21S 2/00 385/33 |
| 4,411,490 A | | 10/1983 | Daniel |
| 5,151,825 A | * | 9/1992 | Nicolas ............... G02B 27/143 359/634 |
| 5,988,843 A | | 11/1999 | Handel |
| 6,149,289 A | | 11/2000 | Kuramitsu |
| 7,113,684 B1 | | 9/2006 | Cianciotto |
| 8,098,434 B1 | | 1/2012 | Hoffend, Jr. |

FOREIGN PATENT DOCUMENTS

| | | | | |
|---|---|---|---|---|
| JP | 08-064019 | | 3/1996 | |
| JP | 10-241430 | | 9/1998 | |
| JP | 11-025726 | | 1/1999 | |
| JP | 2007-115417 | | 5/2007 | |
| JP | 2008-287920 | | 11/2008 | |
| WO | WO 99-47851 | | 9/1999 | |
| WO | WO 2010078418 A1 | * | 7/2010 | ............... G02B 5/02 |
| WO | WO 2012-138503 | | 10/2012 | |

* cited by examiner

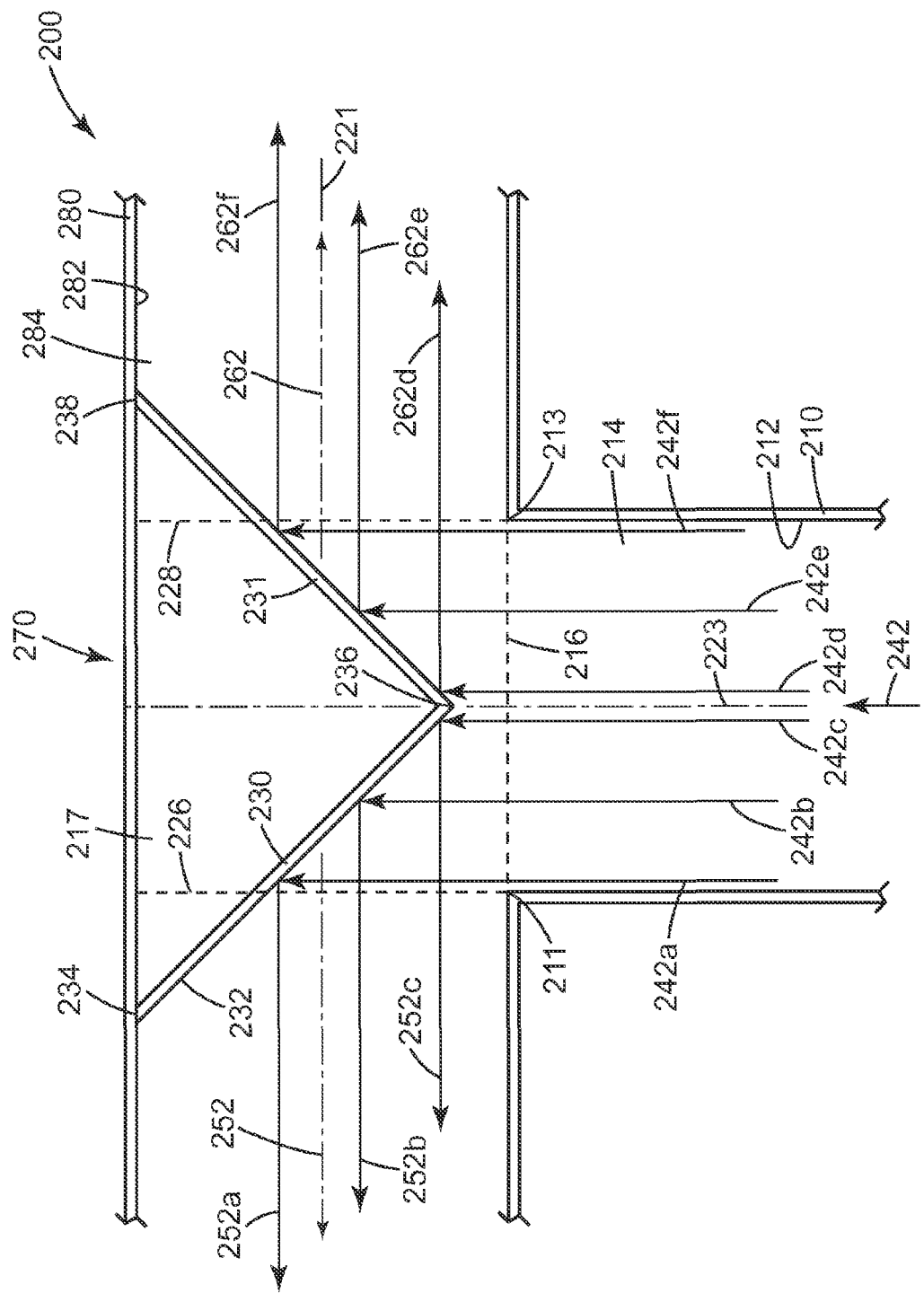

LIGHT DUCT TEE SPLITTER

RELATED APPLICATION

This application is related to the following U.S. Patent Application, which is incorporated by reference: "LIGHT DUCT TEE EXTRACTOR" U.S. Ser. No. 61/473,220, filed on an even date herewith.

BACKGROUND

The long-distance transport of visible light through a building can use large mirror-lined ducts, or smaller solid fibers which exploit total internal reflection. Mirror-lined ducts include advantages of large cross-sectional area and large numerical aperture (enabling larger fluxes with less concentration), a robust and clear propagation medium (that is, air) that leads to both lower attenuation and longer lifetimes, and a potentially lower weight per unit of light flux transported.

SUMMARY

The disclosure generally relates to highly efficient light duct light splitters that are capable of splitting the light propagating within a light duct into two different ducts, with nearly 100 percent efficiency. In particular, the described light splitters are configured in a "Tee" shape with a reflective splitter element. In one aspect, the present disclosure provides a light duct splitter that includes a first light conduit defining a light transport cavity capable of transporting light along a first propagation direction, a second light conduit defining a first light diversion cavity, and a third light conduit defining a second light diversion cavity, the second and the third light conduit intersecting the first light conduit such that the light transport cavity and the first and the second light diversion cavities are contiguous. The light duct splitter further includes a light diverter, having a first reflector disposed at a first diverter angle to the first propagation direction, and a second reflector disposed at a second diverter angle to the first propagation direction, the first and the second reflectors intersecting at a first edge. A first light ray propagating within a collimation angle θ of the first propagation direction that intersects the first reflector is diverted to a second light ray propagating within the collimation angle θ of a second propagation direction in the second light conduit, and a third light ray propagating within the collimation angle θ of the first propagation direction that intersects the second reflector is diverted to a fourth light ray propagating within the collimation angle θ of a third propagation direction in the third light conduit.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein:

FIGS. 2A-2C show cross-sectional schematics of light paths through a light duct splitter.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure provides a novel construction for a light splitter in a mirror-lined light duct. In one particular embodiment, the present disclosure addresses the ability to split partially collimated light travelling through a light duct into two different light ducts, with an efficiency of approximately 100%. The described light duct splitter can be generally applied to rectangular light ducts that intersect in a "Tee" configuration. In one particular embodiment, the light duct can be most effective by using very high efficiency mirrors such as, for example, Vikuiti™ Enhanced Specular Reflector (ESR) film available from 3M Company. In some cases, ESR film can be readily bent about a single axis of curvature, such as the curvatures common in rectangular cross-section light ducts.

Architectural daylighting using mirror-lined light ducts can deliver sunlight deep into the core of multi-floor buildings. Such mirror-lined light ducts can be uniquely enabled by the use of 3M optical films, including mirror films such as ESR film, that have greater than 98% specular reflectivity across the visible spectrum of light. Architectural daylighting is a multi-component system that includes a device for collecting sunlight, and light ducts and extractors for transporting and distributing the sunlight within the building. The typical benefits of using sunlight for interior lighting can include a reduction of energy for office lighting by an average of 25%, improved light quality due to the full spectrum light delivered, and is often more pleasing to office occupants.

In one particular embodiment, the light injected into the light duct is partially collimated light due to the method of light generation. This partially collimated light can generally be described as being included within a cone having border light rays within a collimation angle θ of the central light propagation direction.

In some cases, solar radiation can be collected and concentrated to be injected into the light duct. In some cases, artificial light from various sources can be injected into the light duct. Relatively well-collimated light can be more effectively used in mirror-lined duct systems for transporting light. For example, as sunlight is concentrated, the collimation angle will increase from the input collimation angle of sunlight, about ¼ degree. Generally, the collimation angle θ of concentrated light, such as sunlight, passing into the light duct should be restricted to no greater than about 30 degrees, or no greater than about 25 degrees, or no greater than about 20 degrees, or even no greater than about 15 degrees. In one particular embodiment, the collimation angle θ can be about 18.4 degrees. The accuracy of tracking the sun, as well as the accuracy of the various optical components for injecting the light into the duct, all can contribute to the resulting collimation angle θ.

Figure 1:
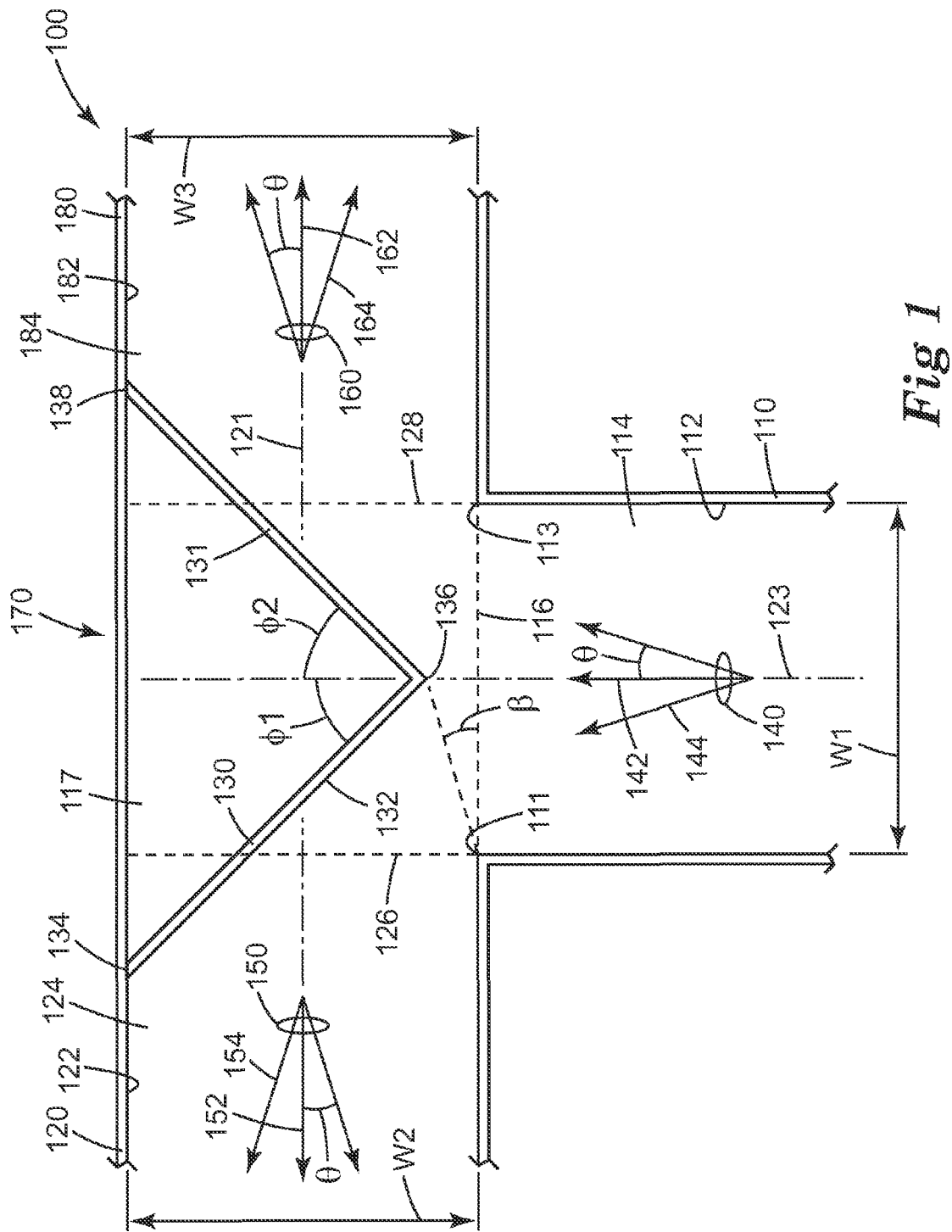
FIG. 1 shows a cross-sectional schematic of a light duct splitter.

FIG. 1 shows a cross-sectional schematic of a light duct splitter 100, according to one aspect of the disclosure. In one particular embodiment, light duct splitter 100 can be described as a light duct "Tee" splitter, since the light ducts intersect in a T-shape. Light duct splitter 100 includes a first light conduit 110 that defines a light transport cavity 114 that is capable of transporting an input light 140 along a first propagation direction 142. Light duct splitter 100 further includes a second light conduit 120 that defines a first light diversion cavity 124 that is capable of transporting a second light 150 along a second propagation direction 152. Light duct splitter 100 still further includes a third light conduit 180 that defines a second light diversion cavity 184 that is capable of transporting a second diverted light 160 along a third propagation direction 162. In one particular embodiment, second light conduit 120 and third light conduit 180 can include ducts having the same cross-sectional area, and the Tee splitter can be symmetric around the center line 123 of the first light conduit 110.

The second and the third light conduits 120, 180, intersect the first light conduit 110 such that the light transport cavity 114 and the first and the second light diversion cavities 124, 184, are contiguous and form a boxed region 117 defined by an output cross section 116 of the first light conduit 110, a first input cross section 126 of the second light conduit 120, and a second input cross section 128 of the third light conduit 180. The boxed region 117 is further defined by a first corner 111 at an intersection of the first light conduit 110 and the second light conduit 120, and also a second corner 113 at an intersection of the first light conduit 110 and the third light conduit 180. The output cross section 116 can have a first light conduit width W1, and the first and second input cross sections 126, 128, can have widths W2, W3, respectively, that are all the same, or they can each be different.

In one particular embodiment, first propagation direction 142 is located along the same direction as a central axis 123 of the first light conduit 110. Input light 140 is partially collimated light travelling along the first propagation direction 142, and includes light within a collimation angle θ; that is, all of the input light 140 is included in a cone of light centered on the first propagation direction 142 and having boundary light rays 144 at the collimation angle θ. In some cases, input light 140 can originate from sunlight which is collected and concentrated before being injected into the first light conduit 110. In some cases, input light can be "artificial light" generated by any known technique such as halogen lamps, arc lamps, light emitting diodes (LEDs), incandescent lamps, and the like.

A light diverter 170 extends between the light transport cavity 114 and the first and second light diversion cavities 124, 184. The light diverter 170 includes a first reflector 130 disposed at a first diverter angle φ1 to the first propagation direction 142, and a second reflector 131 disposed at a second diverter angle φ2 to the first propagation direction 142. For Tee-shaped light ducts having light propagation directions along the axis of each duct as shown in FIG. 1, the first and second diverter angles φ1 and φ2 are each generally equal to 45 degrees. The first and the second reflectors 130, 131, intersect each other at a first edge 136, disposed in boxed region 117.

Each of the first and second reflectors 130, 131, also include a second edge 134, 138, that is disposed in the first and second light diversion cavities 124, 184, outside of boxed region 117, respectively. In one particular embodiment, each of the second edges 134, 138, can be positioned immediately adjacent the respective second and third light conduits 120, 180.

The relationship between the collimation angle θ of the input light 140, the relative width of each of the first light conduit 110, the second light conduit 120, and the third light conduit 180, the position of the first edge 136 (that is, angle β), and the position of the second edges 134, 138, for 100 percent light splitting efficiency can be calculated from the geometry of the system, as known to one of skill in the art. In one particular embodiment, the limiting relationships for the case where second propagation direction 152 and third propagation direction 162 are parallel to each other and both are perpendicular to first propagation direction 142 are given by the relationships $$W_2 \geq \frac{W_1}{2}\left(\frac{1+\tan(\beta)}{1-\tan(\theta)}\right) \text{ and } W_3 \geq \frac{W_1}{2}\left(\frac{1+\tan(\beta)}{1-\tan(\theta)}\right)$$

for θ<45 degrees and β≥0. The light diverter 170 can be positioned within the light duct splitter 100 such that, geometrically, 100 percent splitting efficiency can be achieved for any light intercepting the light diverter (reduced only by any small amount of absorbance or scattering from the highly efficient reflectors), as described elsewhere.

Generally, as described in the following FIGS. 2A-2C, input light 140 propagating within a collimation angle θ of the first propagation direction 142 that intersects the reflective surface 132 of the first reflector 130 is diverted to a second light 150 propagating within the collimation angle θ of a second propagation direction 152 in the second light conduit 120. Further, input light 140 propagating within the collimation angle θ of the first propagation direction 142 that intersects the reflective surface 132 of the second reflector 131 is diverted to a third light ray 160 propagating within the collimation angle θ of a third propagation direction 162 in the third light conduit 180.

First, second, and third light conduits 110, 120, 180, and light diverter 170, can be fabricated from any material commonly used for architectural ductwork, including, for example sheet metals such as steel, galvanized sheet metals, aluminum, plastics and the like. All of the interior surfaces 112, 122, 182, of first, second, and third light conduits 110, 120, 180; and reflective surface 132 of light diverter 170, are made from a material having a high specular reflectivity. A high specular reflectivity can enable efficient light transport along the considerable distances that can occur within architectural light ducts. In some embodiments, the highly specular reflectivity can be achieved using materials such as, for example, highly polished metals, metalized polymer films, and dielectric multilayer reflectors. In one particular embodiment, a multilayer optical film such as Vikuiti™ Enhanced Specular Reflector (ESR) film available from 3M Company can be a preferred material.

Figure 2B:
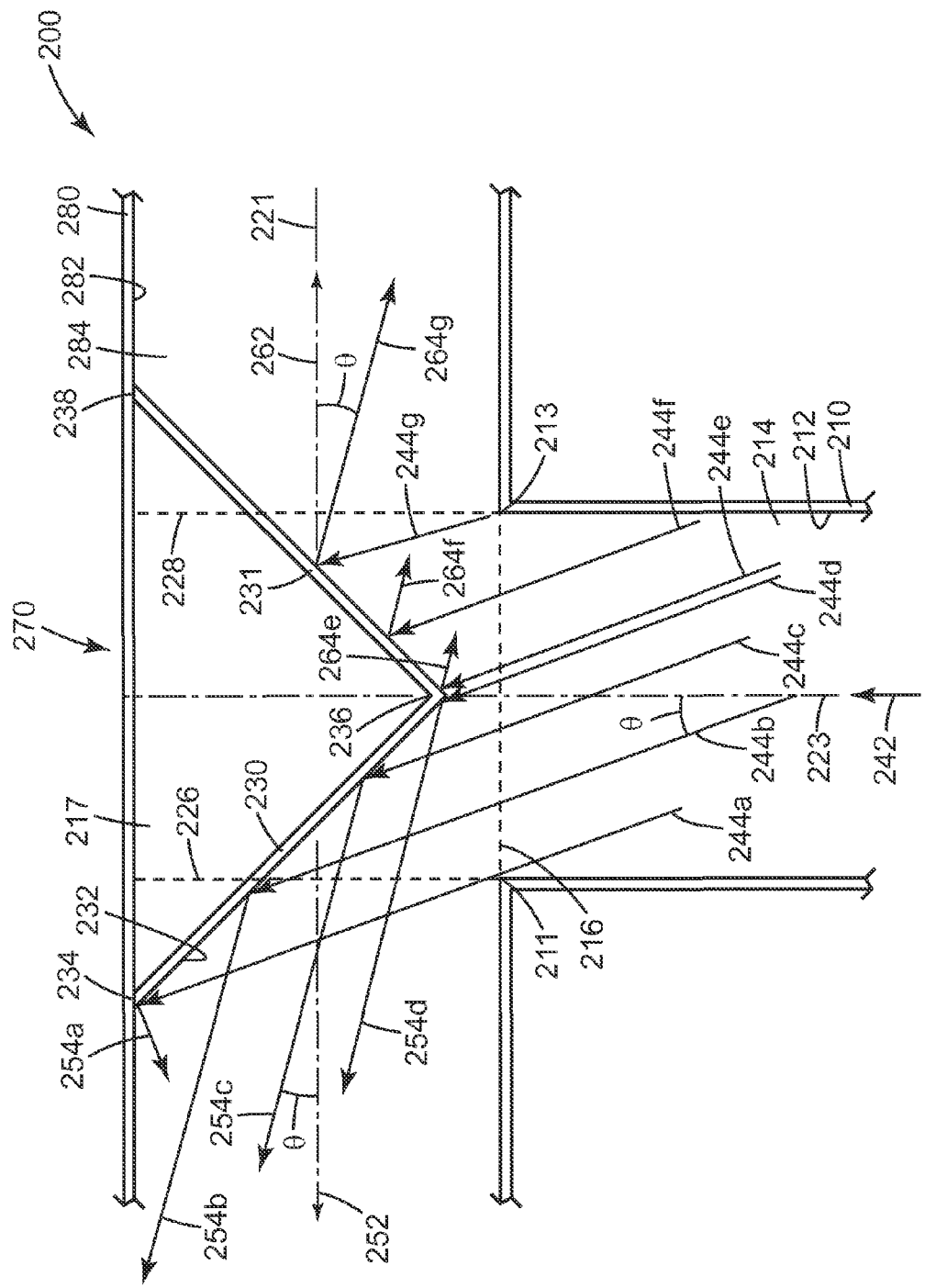
Figure 2C:
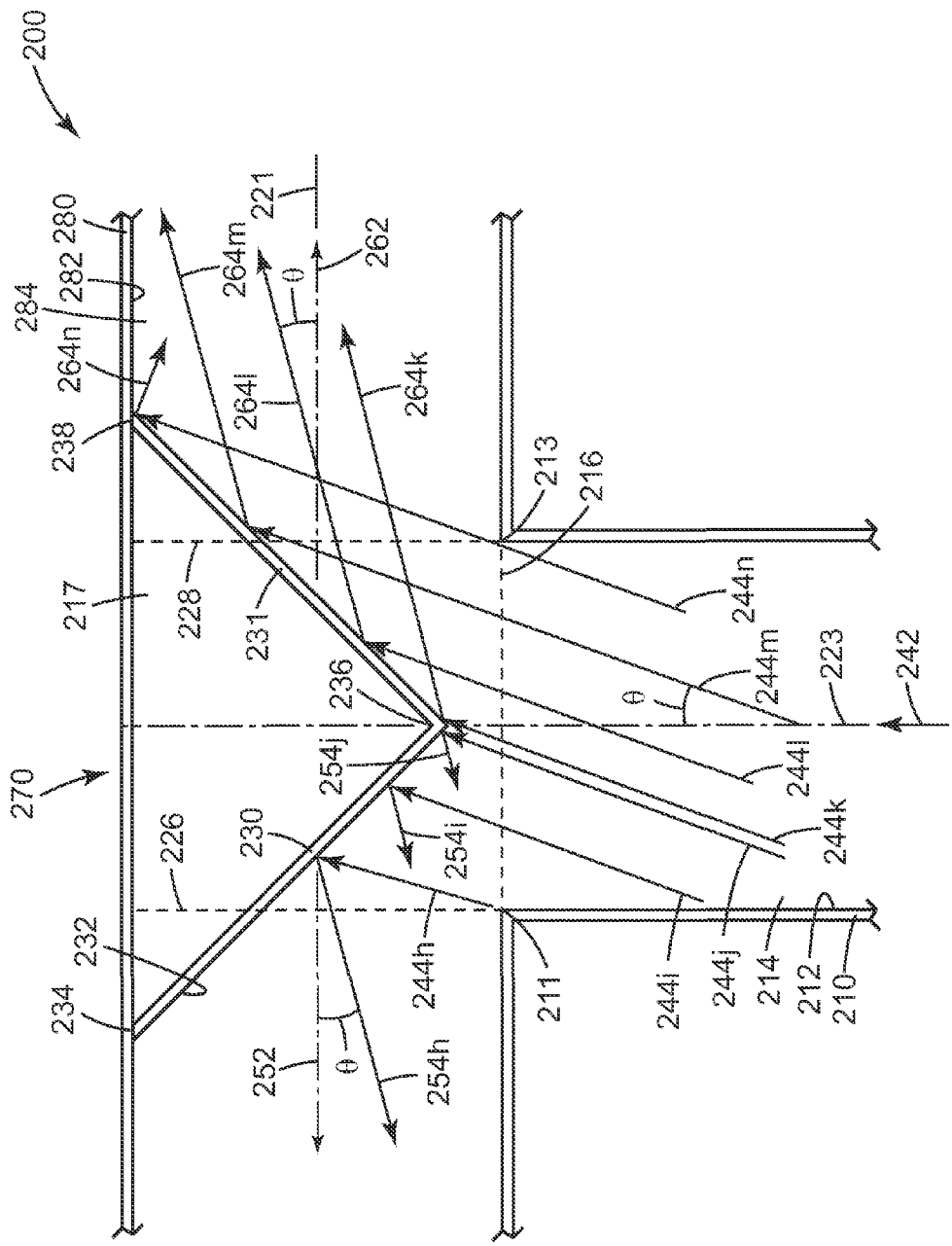

FIGS. 2A-2C show cross-sectional schematics of light paths through a light duct splitter 200, according to one aspect of the disclosure. Each of the elements 210-270 shown in FIGS. 2A-2C correspond to like-numbered elements 110-170 shown in FIG. 1, which have been described previously. For example, first light conduit 110 described with reference to FIG. 1 corresponds to a first light conduit 210 shown in FIGS. 2A-2C, and so on.

FIG. 2A shows a first through a sixth central first rays 242a, 242b, 242c, 242d, 242e, 242f, that are propagating along the first propagation direction 242 of first light conduit 210. Each of the first through third central first rays 242a-242c intercept light diverter 270 along first reflector 230 and are reflected to become first through third central second rays 252a-252c propagating along second propagation direction 252. Each of the fourth through sixth central first rays 242d-242f intercept light diverter 270 along second reflector 231 and are reflected to become fourth through sixth central second rays 262d-262f propagating along third propagation direction 262.

All of the central first light rays (that is, 242a-242f and all others parallel to them) propagating along the first propagation direction 242 that intercept first reflector 230, are diverted to the central second light rays (that is, 252a-252c and all others parallel to them) propagating along the second propagation direction 252. All of the central first light rays (that is, 242a-242f and all others parallel to them) propagating along the first propagation direction 242 that intercept second reflector 231, are diverted to the central third light rays (that is, 262d-262f and all others parallel to them) propagating along the third propagation direction 262.

FIG. 2B shows a first through a seventh boundary first rays 244a, 244b, 244c, 244d, 244e, 244f, 244g, that are propagating at the collimation angle θ to the first propagation direction 242 of first light conduit 210. Each of the first through fourth boundary first rays 244a-244d intercept light diverter 270 along first reflector 230 and are reflected to become first through fourth boundary second rays 254a-254d propagating at the collimation angle θ to second propagation direction 252. First boundary first ray 244a reflects at propagation angle "θ" but almost instantly reflects off interior surface 222 to propagation angle "−θ" relative to the second propagation direction 252 as shown by first boundary second ray 254a. Each of the fifth through seventh boundary first rays 244e-244g intercept light diverter 270 along second reflector 231 and are reflected to become fifth through seventh boundary third rays 264e-264g propagating at the collimation angle θ to third propagation direction 262.

All of the boundary first light rays (that is, 244a-244d and all others parallel to them) propagating at the collimation angle θ to the first propagation direction 242 that intercept first reflector 230, are diverted to the boundary second light rays (that is, 254a-254d and all others parallel to them) propagating at the collimation angle θ to the second propagation direction 252.

All of the boundary first light rays (that is, 244e-244g and all others parallel to them) propagating at the collimation angle θ to the first propagation direction 242 that intercept second reflector 231, are diverted to the boundary third light rays (that is, 264e-264g and all others parallel to them) propagating at the collimation angle θ to the third propagation direction 262.

Of particular interest in FIG. 2B is the path of the first boundary first ray 244a, which is shown passing by first corner 211 to intercept first reflector 230 at second edge 234. First boundary first ray 244a provides a relationship for the position of second edge 234 within light duct splitter 200, for a given collimation angle θ. In one case, for example, any reduction in the length of first reflector 230 (that is, shortening such that the second edge 234 is moved away from second light conduit 220) would decrease the efficiency of splitting, since some of the light rays entering the second light conduit 220 would not intercept the first reflector 230 and would not be reflected to within the collimation angle θ of the second propagation direction 252.

Also of particular interest in FIG. 2B is the path of the fifth boundary first ray 244e, which is shown to intercept second reflector 231 at first edge 236, and is reflected to second corner 213. Fifth boundary first ray 244e provides a relationship for the position of first edge 236 within boxed region 217, for a given collimation angle θ. In one case, for example, any extension of second reflector 231, beyond first edge 236 would decrease the efficiency of splitting, since some of the light incident to second reflector 231 would then be reflected back to the first light conduit 210. In another case, for example, any change in second diverter angle φ2 would necessarily change the position of first edge 236, in order to direct incident light efficiently down second light conduit 220.

FIG. 2C shows an eighth through a fourteenth boundary first rays 244h, 244i, 244j, 244k, 244l, 244m, 244n, that are propagating at the collimation angle θ to the first propagation direction 242 of first light conduit 210. Each of the eighth through tenth boundary first rays 244h-244j intercept light diverter 270 along first reflector 230 and are reflected to become eighth through tenth boundary second rays 254h-254j propagating at the collimation angle θ to second propagation direction 252. All of the boundary first light rays (that is, 244h-244j and all others parallel to them) propagating at the collimation angle θ to the first propagation direction 242 that intercept first reflector 230, are diverted to the boundary second light rays (that is, 254h-254j and all others parallel to them) propagating at the collimation angle θ to the second propagation direction 252.

Each of the eleventh through fourteenth boundary first rays 244k-244n intercept light diverter 270 along second reflector 231 and are reflected to become eleventh through fourteenth boundary third rays 254k-254n propagating at the collimation angle θ to third propagation direction 262. All of the boundary first light rays (that is, 244k-244n and all others parallel to them) propagating at the collimation angle θ to the first propagation direction 242 that intercept second reflector 231, are diverted to the boundary third light rays (that is, 264k-264n and all others parallel to them) propagating at the collimation angle θ to the third propagation direction 262.

Fourteenth boundary first ray 244n reflects at propagation angle "θ" but almost instantly reflects off interior surface 282 to propagation angle "−θ" relative to the third propagation direction 262 as shown by fourteenth boundary second ray 264n.

Of particular interest in FIG. 2C is the path of the tenth boundary first ray 244j, which is shown to intercept first reflector 230 at first edge 236, and is reflected to first corner 211. Tenth boundary first ray 244j provides a relationship for the position of first edge 236 within boxed region 217, for a given collimation angle θ. In one case, for example, any extension of first reflector 230, beyond first edge 236 would decrease the efficiency of splitting, since some of the light incident to first reflector 230 would then be reflected back to the first light conduit 210. In another case, for example, any change in first diverter angle φ1 would necessarily change the position of first edge 236, in order to direct incident light efficiently down second light conduit 220.

Also of particular interest in FIG. 2C is the path of the fourteenth boundary first rays 244n, which is shown pass by second corner 213 to intercept second reflector 231 at third edge 238. Fourteenth boundary first ray 244n provides a relationship for the position of third edge 238 within light duct splitter 200, for a given collimation angle θ. In one case, for example, any reduction in the length of second reflector 231 (that is, shortening such that the third edge 238 is moved away from third light conduit 280) would decrease the efficiency of splitting, since some of the light rays entering the third light conduit 280 would not intercept the second reflector 231 and would not be reflected to within the collimation angle θ of the third propagation direction 262.

Following are a list of embodiments of the present disclosure.

Item 1 is a light duct splitter, comprising: a first light conduit defining a light transport cavity capable of transporting light along a first propagation direction; a second light conduit defining a first light diversion cavity; a third light conduit defining a second light diversion cavity, the second and the third light conduit intersecting the first light conduit such that the light transport cavity and the first and the second light diversion cavities are contiguous; a light diverter, comprising: a first reflector disposed at a first diverter angle to the first light propagation direction; and a second reflector disposed at a second diverter angle to the first light propagation direction, the first and the second reflectors intersecting at a first edge; wherein a first light ray propagating within a collimation angle θ of the first propagation direction that intersects the first reflector is diverted to a second light ray propagating within the collimation angle θ of a second propagation direction in the second light conduit, and wherein a third light ray propagating within a collimation angle θ of the first propagation direction that intersects the second reflector is diverted to a fourth light ray propagating within the collimation angle θ of a third propagation direction in the third light conduit.

Item 2 is the light duct splitter of item 1, wherein the first diverter angle and the second diverter angle each comprise an angle of approximately 45 degrees, and the second and third propagation directions are collinear and each perpendicular to the first propagation direction.

Item 3 is the light duct splitter of item 1 or item 2, wherein each of the first, the second, and the third light conduits include a first, a second, and a third rectangular cross-section, respectively.

Item 4 is the light duct splitter of item 3, wherein each of the first, the second, and the third rectangular cross-sections are the same.

Item 5 is the light duct splitter of item 1 to item 4, wherein the first edge is disposed within a region bounded by the intersection of the light transport cavity and the first and the second light diversion cavities.

Item 6 is the light duct splitter of item 1 to item 5, wherein the first reflector extends between the first edge and the first light diversion cavity, and the second reflector extends between the first edge and the second light diversion cavity.

Item 7 is the light duct splitter of item 1 to item 6, wherein the first edge is positioned in the center of the light transport cavity.

Item 8 is the light duct splitter of item 1 to item 7, wherein the collimation angle is between about 0 degrees and about 30 degrees.

Item 9 is the light duct splitter of item 1 to item 8, wherein the collimation angle is between about 10 degrees and about 20 degrees.

Item 10 is the light duct splitter of item 1 to item 9, wherein the collimation angle is about 18.4 degrees.

Item 11 is the light duct splitter of item 1 to item 10, wherein the first edge of the light diverter is disposed within a boxed region defined by an output cross section of the first light conduit, a first input cross section of the second light conduit, and a second input cross section of the third light conduit.

Item 12 is the light duct splitter of item 11, wherein a second edge of the light diverter is disposed in the first light diversion cavity outside of the boxed region, and a third edge of the light diverter is disposed in the second light diversion cavity outside of the boxed region.

Item 13 is the light duct splitter of claim 11 or item 12, wherein the light diverter comprises an isosceles-shaped triangular reflector having a base disposed perpendicular to the first propagation direction, and an apex centered in the light transport cavity within the boxed region.

Item 14 is the light duct splitter of item 11 to item 13, wherein at least two of the output cross section of the first light conduit, the input cross section of the second light conduit, and the input cross section of the third light conduit have the same dimensions.

Item 15 is the light duct splitter of item 11 to item 14, wherein at least one of the input cross sections of the second light conduit and the third light conduit is smaller than the output cross section of the first light conduit.

Item 16 is the light duct splitter of item 1 to item 15, wherein each of the first and the second diverter angles, and each of the first and the second reflectors can be independently adjusted so that a variable portion of light travelling though the light transport cavity can be diverted to the first and the second light diversion cavities.

Item 17 is the light duct splitter of item 1 to item 16, wherein the first propagation direction is perpendicular to the second propagation direction and the third propagation direction.

Item 18 is the light duct splitter of item 1 to item 17, wherein the second propagation direction is collinear with the third propagation direction.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A light duct splitter, comprising: a first light conduit defining a light transport cavity capable of transporting light along a first propagation direction; a second light conduit defining a first light diversion cavity; a third light conduit defining a second light diversion cavity, the second and the third light conduit intersecting the first light conduit such that the light transport cavity and the first and the second light diversion cavities are contiguous; a light diverter, comprising: a first reflector disposed at a first diverter angle to the first propagation direction, the first reflector including a first edge and a second edge; and a second reflector disposed at a second diverter angle to the first propagation direction, the second reflector including a first edge and a second edge, the first reflector and the second reflector further disposed such that the first edge of the first reflector and the first edge of the second reflector intersect at an angle equal to the sum of the first diverter angle and the second diverter angle; wherein a first light ray propagating within a collimation angle of the first propagation direction that intersects the first reflector is diverted to a second light ray propagating within the collimation angle of a second propagation direction in the second light conduit, and wherein a third light ray propagating within the collimation angle of the first propagation direction that intersects the second reflector is diverted to a fourth light ray propagating within the collimation angle of a third propagation direction in the third light conduit, and wherein the first edge of the first reflector and the first edge of the second reflector intersect within a boxed region defined by an output cross section of the first light conduit, a first input cross section of the second light conduit, and a second input cross section of the third light conduit, and wherein at least one of the first and second input cross sections of the second light conduit and the third light conduit is smaller than the output cross section of the first light conduit.

2. The light duct splitter of claim 1, wherein the first diverter angle and the second diverter angle each comprise an angle of approximately 45 degrees, and the second and third propagation directions are collinear and each perpendicular to the first propagation direction.

3. The light duct splitter of claim 1, wherein each of the first, the second, and the third light conduits include a first, a second, and a third rectangular cross-section, respectively.

4. The light duct splitter of claim 3, wherein at least two of the first, the second, and the third rectangular cross sections are the same.

5. The light duct splitter of claim 1, wherein the intersection of the first edge of the first reflector and the first edge of the second reflector is disposed within a region bounded by the intersection of the light transport cavity and the first and the second light diversion cavities.

6. The light duct splitter of claim 1, wherein the second edge of the first reflector is disposed adjacent an interior surface of the first light diversion cavity, and the second edge of the second reflector is disposed adjacent an interior surface of the second light diversion cavity.

7. The light duct splitter of claim 1, wherein the first edge of the first reflector and the first edge of the second reflector intersect along a centerline of the light transport cavity.

8. The light duct splitter of claim 1, wherein the collimation angle is between about 0 degrees and about 30 degrees.

9. The light duct splitter of claim 1, wherein the collimation angle is between about 10 degrees and about 20 degrees.

10. The light duct splitter of claim 1, wherein the collimation angle is about 18.4 degrees.

11. The light duct splitter of claim 1, wherein the second edge of the first reflector is disposed in the first light diversion cavity outside of the boxed region, and the second edge of the second reflector is disposed in the second light diversion cavity outside of the boxed region.

12. The light duct splitter of claim 1, wherein the light diverter comprises an isosceles-shaped triangular reflector having a base disposed perpendicular to the first propagation direction, a first side defined by the first reflector, a second side defined by the second reflector, and an apex defined by the intersection of the first reflector and the second reflector.

13. The light duct splitter of claim 1, wherein at least two of the output cross section of the first light conduit, the first input cross section of the second light conduit, and the second input cross section of the third light conduit have the same dimensions.

14. The light duct splitter of claim 1, wherein each of the first and the second diverter angles, and each of the first and the second reflectors can be independently adjusted so that a variable portion of light travelling though the light transport cavity can be diverted to the first and the second light diversion cavities.

15. The light duct splitter of claim 1, wherein the first propagation direction is perpendicular to the second propagation direction and the third propagation direction.

16. The light duct splitter of claim 1, wherein the second propagation direction is collinear with the third propagation direction.

17. The light duct splitter of claim 1, wherein the second edge of the first reflector is disposed adjacent an interior surface of the first light diversion cavity outside of the region bounded by the intersection of the light transport cavity and the first and the second light diversion cavities, and the second edge of the second reflector is disposed adjacent an interior surface of the second light diversion cavity outside of the region bounded by the intersection of the light transport cavity and the first and the second light diversion cavities.

18. The light duct splitter of claim 1, wherein the interior surfaces of the first, second, and third light conduits comprise a material having a specular reflectivity for visible light of at least 98%.

* * * * *